United States Patent [19]

Barbe

[11] E Re. 29,342

[45] Reissued Aug. 9, 1977

[54] BUCKLE FOR RETARDED AUTOMATIC UNLOCKING OF SAFETY BELTS AND HARNESSES OF PARACHUTING EQUIPMENT AND OF VEHICLES

[75] Inventor: Guy Barbe, Marseille, France

[73] Assignee: Etudes et Fabrications Aeronautiques, Paris, France

[21] Appl. No.: 697,012

[22] Filed: June 17, 1976

Related U.S. Patent Documents

Reissue of:

[64] Patent No.: 3,952,381
Issued: Apr. 27, 1976
Appl. No.: 507,874
Filed: Sept. 20, 1974

[30] Foreign Application Priority Data

Sept. 21, 1973 France ..... 73.34955

[51] Int. Cl.[2] ..... B64D 17/38

[52] U.S. Cl. ..... 24/230 A; 244/151 B; 294/83 A

[58] Field of Search ..... 24/230 A, 230 AT, 230 AV; 294/83 AB, 83 A, 83 R; 244/151 B, 150

[56] References Cited

U.S. PATENT DOCUMENTS

| | | | |
|---|---|---|---|
| 2,919,154 | 12/1959 | Schart | 294/83 A |
| 3,233,296 | 2/1966 | Whittingham | 24/230 A X |
| 3,235,930 | 2/1966 | Chapin et al. | 24/230 A |
| 3,249,328 | 5/1966 | Knowles | 294/83 A X |
| 3,306,653 | 2/1967 | Gaylord | 294/83 R |
| 3,418,007 | 12/1968 | Jantzen | 24/230 A X |
| 3,451,720 | 6/1969 | Makinen | 24/230 A X |
| 3,466,081 | 9/1969 | Femia | 294/83 R |
| 3,475,799 | 11/1969 | Marchfelder | 24/230 A |
| 3,542,426 | 11/1970 | Radke | 24/230 A X |
| 3,790,994 | 2/1974 | Jakob | 24/230 A |
| 3,855,674 | 12/1974 | Thiel | 24/230 A |

FOREIGN PATENT DOCUMENTS

| | | | |
|---|---|---|---|
| 1,346,744 | 11/1963 | France | 24/230 A |
| 68,383 | 9/1973 | Luxembourg | |

*Primary Examiner*—Roy D. Frazier
*Assistant Examiner*—Rodney H. Bonck
*Attorney, Agent, or Firm*—Bacon & Thomas

[57] ABSTRACT

Buckle for retarded automatic unlocking of safety belts and harnesses of parachuting equipment or of vehicles, which comprises a frame slideably mounted in a casing and a shaft in the frame for supporting a swinging bolt adapted to imprison the shackle of a strap, or release either instantaneously under the direct action of a manual control means or with a delay under the action of an automatic control means connected to the bolt and actuated by springs compressed by the shackle when the shackle is introduced inside the casing. The automatic control means is itself locked by means adapted to be slowly withdrawn, by means of a brake, under the action of a traction force exerted by the shackle on the bolt providing the sliding movement of the frame against the action of a return spring bringing back the frame to its initial position as soon as the traction force of the shackle on the strap substantially diminishes or ceases.

16 Claims, 11 Drawing Figures

BUCKLE FOR RETARDED AUTOMATIC UNLOCKING OF SAFETY BELTS AND HARNESSES OF PARACHUTING EQUIPMENT AND OF VEHICLES

Matter enclosed in heavy brackets [ ] appears in the original patent but forms no part of this reissue specification; matter printed in italics indicates the additions made by reissue.

The present invention mainly relates to harnesses for parachuting men, animals and parcels and, also, to safety belts for vehicles, planes and ships.

The invention has for its object a buckle of retarded or delayed automatic unlocking for permitting the releasing or loosening of a strap from its attachment point as soon as a temporary or continuous brutal traction exterted on the strap has substantially diminished or ceased.

When applied to parachuting equipments, the buckle permits either to automatically detach after landing, the parachute from the person or the parcel attached to it, or to automatically unload the parachutist, at a predetermined moment, of a load which [be] *he* carries. In the first case, the unlocking of the apparatus is instantaneously carried out when the traction exerted on the strap by the parachutist ceases. In the second case, it is the slowing down caused by the opening of the parachute which controls the retarded or delayed automatic unlocking of the apparatus.

When applied to safety belts for vehicles, the buckle automatically detaches the conductor and/or the passengers of a hit vehicle, passengers which are imprisoned on the seat. In fact, the traction exerted on the belt by the brutal slowing down or deceleration due to an impact provokes the operation of the automatic opening device of the buckle which connects the strap to its attachment point to the vehicle, for detaching the strap from the attachment point with a predetermined delay.

In any case, the apparatus is provided with auxiliary locking means which operates as long as the traction exerted on the strap is greater or exceeds the security margin fixed for triggering the starting of the automatic opening. Furthermore, the apparatus is equipped with a manual control means for the instantaneous unlocking of the buckle.

In a preferred embodiment of the invention, the apparatus comprises slideably mounted in a casing, a frame supporting by a shaft an oscillating or swinging bolt adapted to imprison the shackle of a strap, or to instantaneously release it either under the direct action of a manual control means or with a certain delay under the action of an automatic control means connected to the bolt and actuated by springs compressed by the shackle during its insertion in the casing. This control means is itself locked by means which are adapted to slowly move aside by means of a brake, under the action of a traction force exerted by the shackle on the bolt providing the sliding movement of the frame against the action of a return spring which brings the frame in its initial position when the traction force of the shackle on the strap diminishes or ceases.

The automatic control means comprises a lever-arm oscillating or swinging on a shaft common to the bolt with which it cooperates for the unlocking operation, the lever arm having its free end held against the action of a return spring by means of a cam integrally connected to a shaft rotated by a set of pendulum members. The ends of the pendulum members are connected on one hand to the brake, and on the other hand to drive springs compressed by the shackle, which springs swing the pendulum members when a stop means is withdrawn under the action of the traction force providing the sliding of the frame. The stop means or member is supported by a platen transversely displaceable on the frame by means of a rail which cooperates with a fixed pin or finger of the casing adapted to be retracted for eliminating the automatism of the unlocking operation.

The brake which slows down the swinging or oscillation of the pendulum members causing the rotation of the unlocking cam of the control lever-arm of the bolt, is a mercury micro-pump the piston of which, connected to one of the pendulum members, forces slowly back the fluid existing on its one side, by means of a return pipe by constraining the fluid to traverse a nozzle adjustable by means of a needle.

The manual control means is a slide valve one of the ends of which end which is outside of the casing, rests on a return spring whereas the other end may abut against the heel of a bolt for swinging or oscillating the bolt and releasing the shackle instantaneously ejected by the drive springs of the automatic unlocking means. The manual control means may be equipped with a force reduction gear in order that the unlocking pressure to be exerted be small.

Other objects and a fuller understanding of the invention may be had by referring to the following description and claims, taken in conjunction with the accompanying drawings in which:

Figure 9:
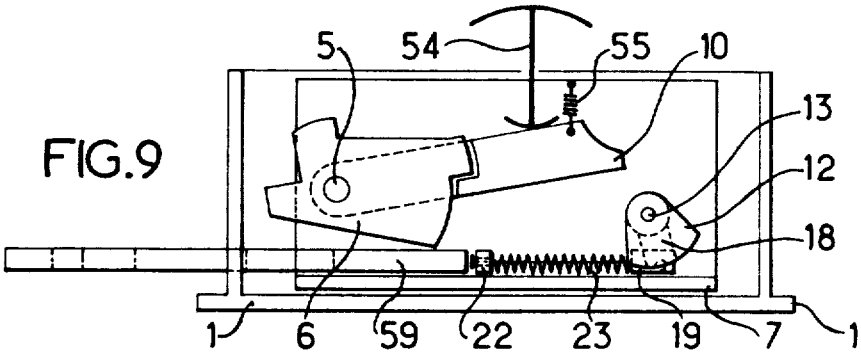

FIG. 9 schematically shows the buckle in its open position after the automatic unlocking operation,

[FIG.] *FIGS.* 10 and 11 schematically show the provisional antireturn mechanism of the counter bolt.

Referring now to the drawings, the reference numeral 1 designates the casing of the apparatus according to the present invention with its sole-piece 2 pierced with holes 3 for its fixation. The two longitudinal parallel walls of the casing are provided with two oblong apertures 4 (see FIGS. 1 and 2) opposite each other. In these apertures slide the end portions of a shaft 5 of a bolt 6 swinging on the shaft 5 and which shaft also traverses the two longitudinal walls of the frame 7. The shaft 5 is adapted to slide in the casing 1 within the limits permitted by the oblong apertures 4 and against the action of a return spring 8 placed between the casing 1 and a stirrup 9 which is itself slidable due to its being connected to the frame 7 by means of the shaft 5 of bolt 6.

The stirrup 9 is located outside the casing 1 and is parallel to the sides of casing 1. The bolt 6 cooperates with a lever-arm 10 forming a fork and hinged to shaft 5. On the lever-arm 10 is fixed a spring 11 which maintains the bolt 6 in its locking position and, in this position, spring 11 permits the association of the lever-arm 10 with the bolt 6 (FIG. 2) by means of the particular forms which each of the lever-arm 10 and bolt 6 have.

The free end of the lever-arm 10 is locked by a cam 12 integrally connected to a further shaft 13 the ends of which are fixed in the two walls of the sliding frame 7. On shaft 13 and at each side of cam 12 are provided a stop member 14 which swings with the shaft 13 and cam 12, and a further cam 15 called "anti-return" cam which cooperates with the end of a spring-lamella 16 fixed at the bottom of frame 7 and shown in [FIG.] *FIGS.* 1, 10 and 11. The spring-lamella 16 is retractable by means of a pawl 69 of the lever-arm 10.

At each side of the stop members 14 and anti-return cam 15 and on the shaft 13 are provided pendulum members 17 and 18 the free ends of which are provided with swinging upper yokes 20' and 20, and swinging lower yokes 19' and 19.

The yokes 19' and 19 of the lower ends of the pendulum members 17 and 18 are connected by means of rods 21 to a cross-beam 22. Intermediate springs 23 rest by their ends against the cross-beam 22 and the yokes 19 and 19' respectively.

Figure 2:
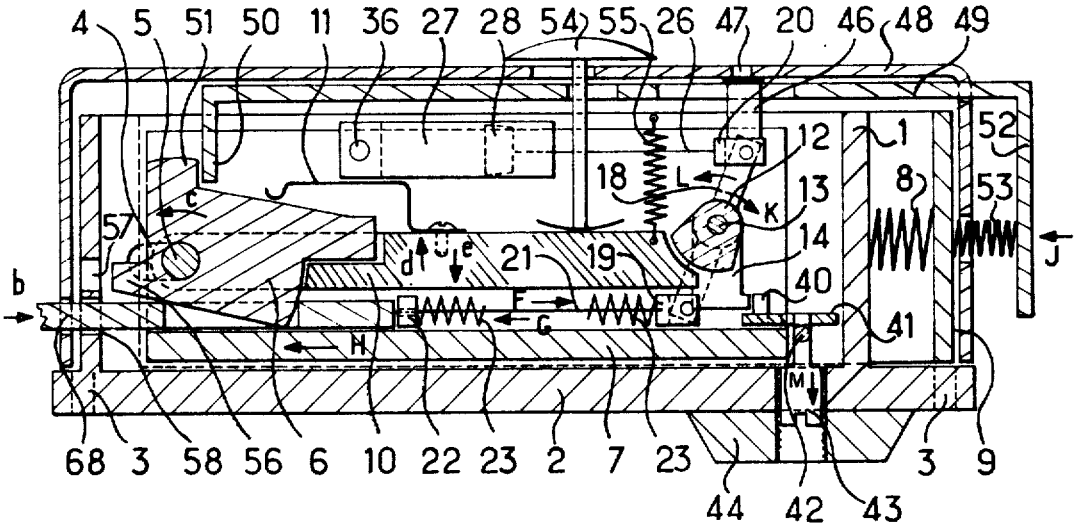
FIG. 2 is an elevation cross-sectional view according to line II—II of FIG. 1.
Figure 1:
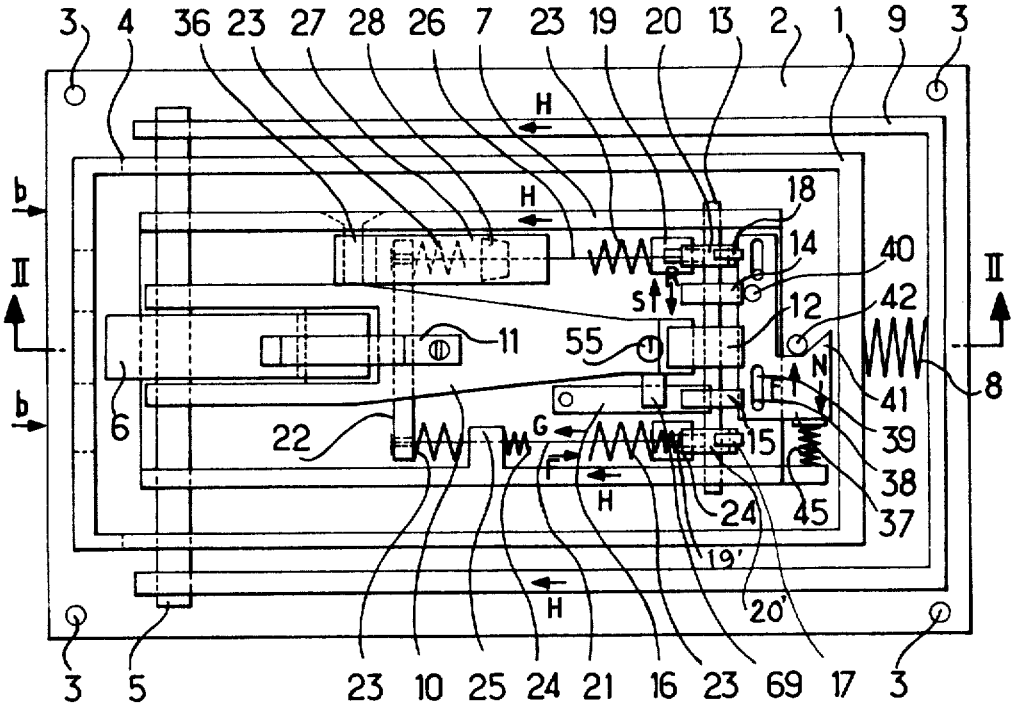
FIG. 1 is a plane view of the apparatus according to the invention with the cover removed.

Yokes 20' and 20 of the upper ends of the pendulum members 17 and 18 are connected respectively, for the member 17, to a resetting spring 24 which rests on the one hand against a stop member 25 of the sliding frame 7 and on the other hand on the yoke 20', and for the pendulum member 18, to a rod 26 of the piston of the brake 27 (see FIGS. 1 and 2).

Figure 3:
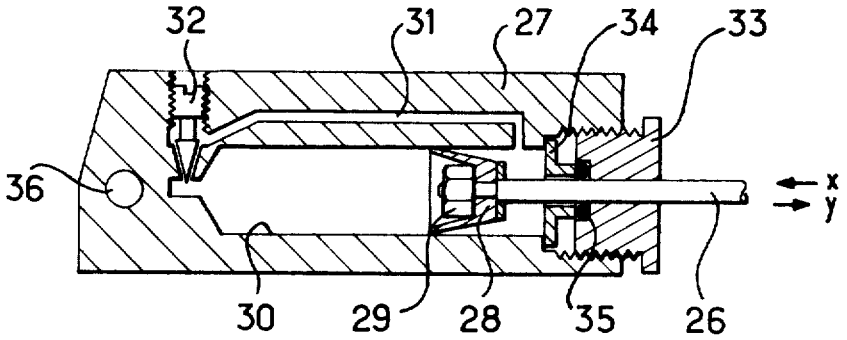
FIG. 3 is a cross-sectional view, in a greater scale, of the unlocking brake.

Brake 27, which is shown in detail in FIG. 3, comprises a piston 28 made of flexible material, fixed at the end of the rod 26 by means of a stop ring 29, the piston being adapted to slide inside cylinder 30. The chambers of cylinder 30, at the rear and front of piston 28 are in relation with each other by means of a channel 31 the inlet of which is provided with a needle screw 32 forming an adjustable nozzle. A pressure packing-box 33, with its washer 34 and its gasket or seal 35 ensure the tightness of the passage of the rod 26 of the piston 28. The brake 27, thus formed, is provided with a fixation and oscillation orifice 36 to the frame 7.

Figure 8:
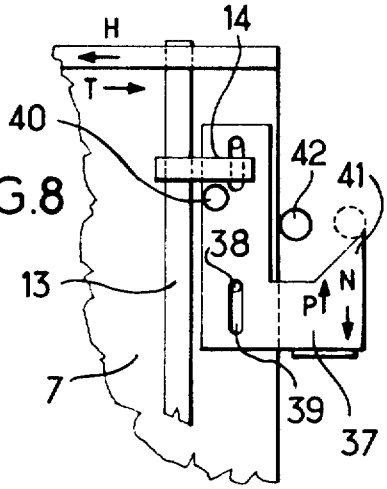
FIG. 8 shows in detail, in a greater scale, the discarding pr withdrawal means of the automatic unlocking stop member.

At the rear of frame 7 is mounted a platen 37 adapted to transversely slide against the action of a return spring 45 within the limits permitted by the displacement of fingers 38, integrally connected to the frame 7, in the oblong apertures 39 made in the [plaplaten] *platen* 37, which platen is provided with an pin 40 located opposite the stop member 14 integrally provided on the shaft 13 (see FIGS. 1 and 8). On FIG. 8, pin 40 is represented adjacent stop member 14, i.e. after automatic opening of the apparatus. Platen 37 is provided with a beak 41 which constitutes on oblique slope cooperating with a stop member 42 the threaded tail 43 of which is screwed in the sole-piece 2 of casing 1 and facing a guide pan 44.

The upper yoke 20 of the pendulum member 18 is provided with a resetting control element 46 which, in the locked position is located opposite an aperture 47 made in a cover 48 capping the casing of the apparatus and its different parts (FIG. 2).

The manual unlocking control means comprises a slide valve 49 one of the extremities 50 of which cooperates with a heel or flange 51 of the oscillating bolt 6, whereas the other extremity 52 of the slide valve 49, [extrimity] *extremity* which extends out of cover 48 compresses a return spring 53 for the unlocking operation.

The resetting control means is a plunger 54 which traverses the cover 48 and by its extremity rests on the lever-arm 10 against the action of a spring 55 for the unlocking operation.

For the safety locking, the bolt 6 comprises a rear heel or flange 56, which is adapted to be engaged in a cut or groove 57, made in one of the walls of the casing 1, during the period when the traction force is the most important. The grooves 57 is located just above an aperture 58 which permits the insertion of one of the shackles 59 (FIG. 4) or 60 (FIG. 7) in the apparatus.

The mode of operation of the apparatus according to the present invention is as follows:

For carrying out the buckling operation, the shackle 60 (FIG. 7) or 59 (FIG. 4) is introduced in the slot 68 of cover 48 according to arrow b of FIG. 2. The shackle 60 lifts the bolt 6 according to arrow c and the end of shackle 60 comes into contact with the cross-beam 22. By keeping on the insertion of the shackle, the motor or drive springs 23 are simultaneously compressed. When the aperture 61 of the shackle comes under the latch of bolt 6, the latch pressed by the spring 11 is engaged in the aperture 61 and thus ensures the locking of the shackle.

In all the mode of use of the apparatus according to the invention, it is the important traction force exerted by the deceleration or slowing down which is used for triggering the mechanism which provides the retarded automatic unlocking or opening of the apparatus.

During a brutal traction exerted on the shackle 60, imprisoned by the bolt 6, it follows as a consequence the sliding of frame 7, by means of the shaft 5 within the limit permissible by the oblong apertures 4 made in the walls of casing 1 and simultaneously, the sliding of the stirrup 9 located outside casing 1 in the direction of arrows H (FIGS. 1 and 2) after compressing the spring 8. The sliding movement entails the driving of platen 37, which is connected to the frame 7, in the direction of arrow H, which platen by means of its slope 41 in contact with the stop member 42 of casing 1, is displaced transversally to the casing 1 against the action of spring 45 which is compressed owing to the guide fingers 38 which slide in the apertures 39 of the platen 37.

The platen 37 is displaced in the direction of arrow N, as shown in FIG. 1. FIG. 8 shows in detail this movement as soon as the traction force has ceased. In fact, immediately after the traction force, particularly if the traction has ceased or has substantially diminished in force, the frame is brought back to its initial position by the spring 8. The stop member 42 is shown in dashed lines when the traction force, according to arrow H, is at its maximum and in full lines after that the platen (or stirrup) is brought back in the direction of arrow T. This translation operation of the platen 37 has for effect the releasing of the stop member 14, integrally connected to the shaft 13, from pin 40 and consequently the swinging of cam 12, of the stop member 14 and the cam 15 as well as of the pendulum members 17 and 18 connected to the shaft 13, under the action of the decompression of the motor springs 23 compressed by the cross-beam 22 as above explained. This swinging takes place in the direction of arrow K as shown in FIG. 2.

Figure 10:
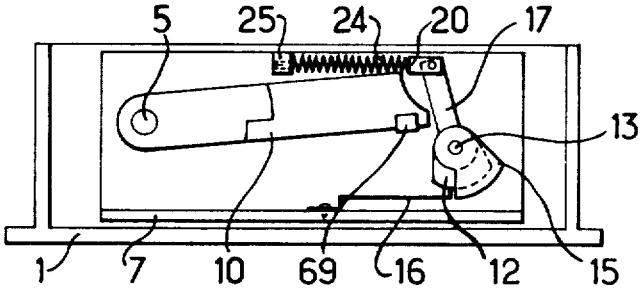

The swinging of the pendulum members 17 and 18 of the shaft 13 and the elements which are connected to the shaft takes place slowly because of the fact that it is slowed down by the micro-pump 27, the rod 26 of the piston 28 of which is connected with the pendulum member 18 (FIG. 1). In fact, under the pushing action of piston 28 the fluid contained inside cylinder 30, particularly mercury, slowly flows in the channel 31 through the nozzle partly obturated by the needle screw 32. The fluid, downstream of piston 28 is conveyed by the channel 31 to the upstream of the piston (FIG. 3). During this slow swinging operation, the resetting spring 24 is compressed by means of the pendulum member 17 as shown in FIG. 10.

Figure 11:
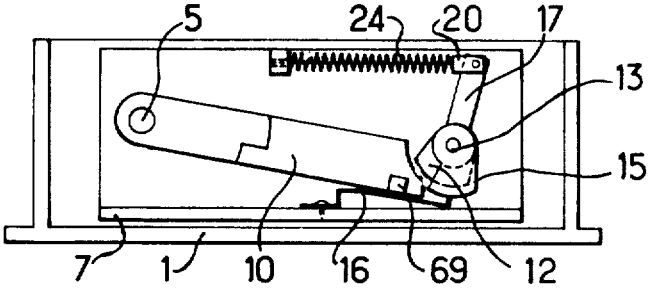

At the end of the above swinging operation, the cam 12 releases the end of lever-arm 10 which under the impulse of the return spring 55, swings around shaft 5 according to arrow d (FIG. 2) simultaneously causing the swinging of the bolt 6 according to arrow c, which releases the shackle 60 which is expelled out from the slot 68 by means of the motor springs 23 which decompress themselves in the direction of arrow G (FIGS. 1 and 2). The motor springs 23 exercising no more action, the swinging of the pendulum members is stopped. As shown in FIG. 8, the platen 37 remains in its retracted position because pin 40, abutting against stop member 14, constrains the platen to remain in this position. Also at the end of the swinging operation, as shown in FIG. 10, the spring lamella 16 fixed at the bottom of frame 7, freed of the action of the pawl 69 integrally connected to the lever-arm 10, comes into contact with cam 15 preventing the return of the pendulum members 17 and 18 and, consequently, the premature resetting of the apparatus. The resetting operation is made possible by pressing down the plunger 54 which has for effect the lowering of the lever-arm 10 and simultaneously of the bolt 6 under the action of the spring 11. This operation brings back the pawl 69 in abutment against the spring lamella 16 which is retracted, thus liberating the anti-return cam 15 and permitting the swinging of the pendulum members 17 and 18 and the elements which are connected to them by means of the shaft 13, under the action of the resetting spring 24 and this in the direction of arrow L. These details are shown in FIGS. 2 and 11.

The return back operation of the pendulum members 17 and 18 simultaneously entails the retraction or withdrawal of piston 28 inside cylinder 30 through the fluid, owing to the retraction of the skirt of the piston (FIG. 3) and the withdrawal of the stop member 14 which releases pin 40, thus permitting to platen 37 to return to its initial position under the action of spring 45 (FIG. 1).

The visual control of the resetting operation is obtained by ascertaining that the colored indicator of the element 46, integrally connected to the yoke 20 of the pendulum member 18 is in correspondence with the aperture 47 made in the cover 48. This control also permits to ensure that the platen 37 has come back to its waiting position (FIG. 1), which indicates that the apparatus is set. In fact, as long as the apparatus is not set, the control element 46 having slided, its colored indicator is not seen, whereas, if the indicator was seen, the resetting would be impossible and this position would mean that there is a bad manoeuver.

A further visual control of the non-set apparatus is determined by the raised position of the plunger 54.

It is possible to adjust the sensibility of the triggering threshold of the automatic retarded opening of the apparatus by slightly displacing the stop member 14 on the shaft 13. If this member is displaced in the direction of the arrow S, pin 40 becomes slightly offset in the opposite direction. It follows that when there is a traction force, pin 40 releases the stop member 14 before that the platen 13 has its complete translation in the direction of arrow N (FIG. 1) and, consequently, the operation of the apparatus is triggered well before the total compression of the return spring is completed, which corresponds to a traction force less important on the shackle.

The contrary effect is obtained by displacing the stop member 14 in the opposite direction corresponding to arrow R. In this case the triggering is caused by an important traction force on the shackle, thus necessitating a maximum compression of spring 8 as well as the complete displacement of platen 37.

The manual opening of the apparatus is carried out by proceeding by thrust according to arrow J against the action of spring 53, on the out of casing end 52 of the slide valve 49. In fact, from this operation it follows that the slide valve 49 slides and entails the instantaneous swinging of the bolt 6 under the action of the other end 50 of the slide valve on the heel 51 of the bolt 6. The shackle 60 released by the bolt 6, is ejected by the cross-beam 22 under the action of the motor springs 23.

It is also possible to cancel the triggering of the retarded automatic opening of the apparatus without for this reason modifying the different steps of instantaneous manual opening above explained. To this effect, it is sufficient to retract stop member 42 by unscrewing its tail 43 which operation provides the withdrawal of the stop member in the direction of the arrow M (FIG. 2). The traction force on the shackle is thus without effect and does not permit the triggering of the mechanism, while it maintains the apparatus in its set position.

Such as above described, the apparatus of the present application applies to parachuting equipments for the automatic unloading of a load because, even if the apparatus is set to its automatic position and that the retarded triggering steps are started, the person using the apparatus may, at any moments, cancel or reduce the determined period of delay by performing himself the instantaneous manual opening of the apparatus. The apparatus also finds applications for safety belts of the vehicles.

Due to the fact that the triggering steps of the retarded automatic opening is effective only after that the frame 7 is brought back to its position under the action of spring 8, and long as the traction force exerted on the shackle is higher than the force of the spring the locking is ensured by the insertion of the heel or flange 56 of bolt 6 in the groove 57 of casing 1 (FIG. 2). This is the case when during parachuting of persons the manual unlocking cannot take place because of the fact that the apparatus is in constant locking position because of the traction force exerted by the weight of the parachutist on the shackle. Consequently, the choice of a return spring 8 adapted to a predetermined traction force, permits the use of the apparatus for various applications such as parachuting of persons or parcels because it provides the instantaneous unlocking of the shackle which releases the parachute as soon as it lands.

Figure 4:
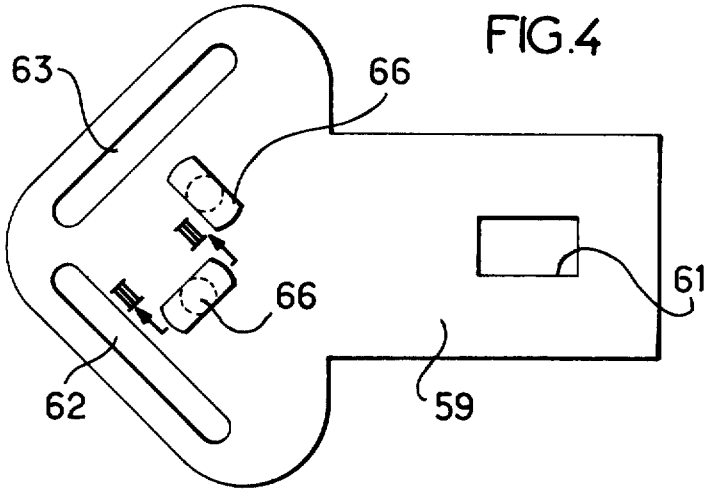
FIG. 4 shows a shackle of a parachuting strap.
Figure 7:
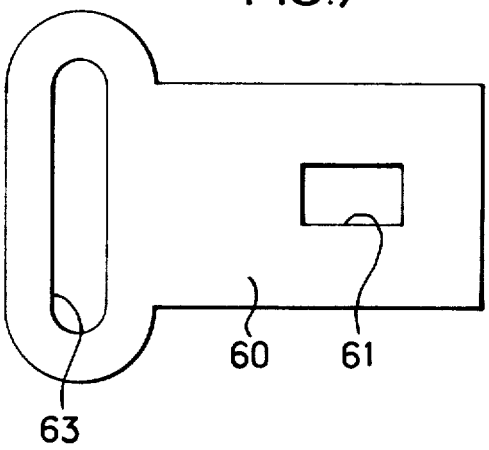
FIG. 7 shows a shackle for a strap of a safety belt or a parachuting belt.

The shackle 60, shown in FIG. 7, is adapted to be used as well for safety belts for vehicles as for harnesses for parachuting, whereas the shackle shown in FIG. 4 is used for parachuting, particularly when there is the need of disposing of two attachments.

Figure 5:
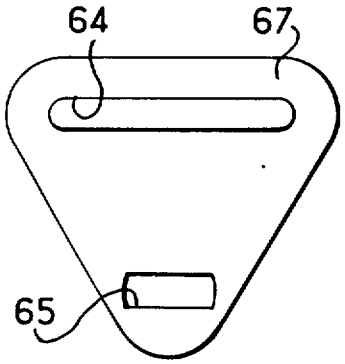
FIG. 5 shows a connection triangle plate to the shackle shown in FIG. 4.
Figure 6:
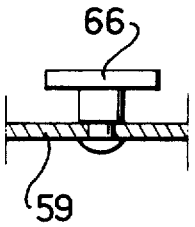
FIG. 6 is a cross-sectional view according to line III—III of FIG. 4 and shows the way of connecting the shackle and the triangle plate.

The shackle 59 may be used alone by passing two straps through slots 62 and 63. When there is a need for esparating the two straps after using the apparatus, it is possible to use the coupling triangle plate 67 (FIG. 5) and in this case only one slot 62 or 63 of the strap is used, the other strap being engaged in the slot 64 of the triangle plate 67.

For coupling the triangle plate 67 on the shackle 59, it suffices to engage the aperture 65 on pivot 66 and to pivot the triangle plate by 45°.

It is evident that the above described apparatus may be subjected to all useful modifications of details without departing from the scope of the invention particularly, when the manual control means 49 may be equipped with an incorporated reduction gear system. Also, it is possible to provide the apparatus with an auxiliary casing provided with a manual control of instantaneous locking acting on the manual control means 49, the auxiliary casing permitting the fixing of the apparatus, either on vehicles or on harnesses for parachuting.

I claim:

1. A buckle for retarded automatic unlocking the shackle of safety belts and harnesses, said buckle comprising:

a casing for receiving the shackle;

a frame means slideably mounted with respect to said casing and including a frame means return spring connected to said casing for biasing said frame means to an initial position;

a shaft mounted through said frame means;

a bolt rotatably mounted on said shaft for releasably engaging and locking the shackle;

an automatic unlocking control rotatably mounted on said shaft and engaging said bolt for disengaging said bolt from the shackle for unlocking the shackle from said bolt;

an auxiliary locking means including a movable meand supported by said frame means and releasably engaging and locking said automatic unlocking control so as to block rotation of said control to prevent unlocking the shackle from said bolt;

at least one drive spring, connected to said movable means, compressed by the shackle when the shackle is inserted into said casing and biasing said movable means for movement out of engagement with said automatic unlocking control for unlocking said automatic unlocking control said auxiliary locking means further including a movable latch means withdrawably abutting said movable means for securing said movable means against the biasing of said drive spring and a brake means connected to said movable means for retarding rapid acceleration of said movable means under the urging of said drive spring when said movable latch means is withdrawn from abutting said movable means;

whereby said automatic unlocking control is slowly unlocked under the action of a traction force exerted by the shackle on said bolt, which traction force is sufficient to slideably move said frame means against the bias of said frame means return spring, said frame means return spring returning said frame means to its initial position as soon as the traction force of the shackle on said bolt substantially diminishes.

2. A buckle according to claim 1 wherein said automatic unlocking control comprises:

a lever arm having one end rotatably mounted on said shaft; and a lever arm return spring connected to said lever arm for biasing said lever arm into engagement with said bolt for disengaging said bolt from the shackle;

and wherein said movable means of said auxiliary locking means includes:

a further shaft rotatably supported by said frame means;

a locking arm integrally connected to said further shaft for engaging the other end of said lever arm for locking said lever arm against the bias of said lever arm return spring;

a pendulum means integrally connected to said further shaft and having a plurality of extremities, a first extremity of said plurality of extremities being connected to said brake means and a second extremity of said plurality of extremities being connected to said drive spring, whereby said drive spring biases said pendulum for rotation of said further shaft for disengagement of said locking cam from the other end of said lever arm and said brake means retards the rapid acceleration of the rotation;

a stop member integrally connected to said further shaft for preventing the rotation of said further shaft when said movable latch means is abutting said stop member;

and in addition wherein said movable latch means includes a pin withdrawably abutting said stop member for securing said stop member, and preventing rotation of said further shaft; said pin being withdrawn from securing said stop member, thereby permitting rotation of said further shaft and unlocking of said lever arm, when the traction force exerted by the shackle on said bolt is sufficient to slideably move said frame means against the bias of said frame return spring.

3. A buckle according to claim 2 wherein said movable latch means further includes a platen transversely displaceably mounted in said frame means, said pin being mounted on said platen adjacent said stop member;

and wherein said casing includes a further stop member retractably fixed thereto adjacent said platen;

said platen including an oblique slope which cooperates with said further stop member when said frame means slides in said casing to transversely displace said platen in said frame means thereby withdrawing said pin from abutting said stop member;

said further stop member being retracted for eliminating the automatic unlocking of the shackle from the bolt.

4. A buckle according to claim 3 further including a platen return spring for biasing said platen to an initial position.

5. A buckle according to claim 2 wherein said movable means of said auxiliary locking means further includes an anti-return cam integrally connected to said further shaft;

and wherein said buckle further comprises:

a lamella spring having one end fixed to said frame means and the other end retractably abutting against said anti-return cam for preventing rotation of said further shaft and return of said cam into its lever arm engagement position when said lever arm is unlocked from said cam; and a manual resetting plunger which acts on said lever arm to rotate said lever arm against the bias of said lever arm return spring;

said lever arm including a pawl which abuts against said lamella spring, when said lever arm is acted on by said manual resetting plunger, to retract said lamella spring from abutting against said anti-return cam to allow said locking cam to return to its lever arm engagement position and lock said lever arm.

6. A buckle according to claim 5 wherein said frame means has an additional stop member and said pendulum means has a third extremity;

said buckle further comprising a resetting spring connecting said third extremity to said additional stop member, said resetting spring being compressed by said pendulum, means when said further shaft rotates during the unlocking of said automatic unlocking control, said compressed resetting spring causing the return of said locking cam to its lever arm engagement position to re-engage and relock said lever arm when said pawl of said lever arm retracts said lamella spring from abutting against said anti-return cam.

7. A buckle as claimed in claim 2 further comprising:

a cover for said buckle;

a viewing aperture formed in said cover; and a resetting indicator element integrally connected to one of said plurality of extremities of said pendulum meand and located opposite said viewing aperture and provided with an indicator which when in correspondence with said viewing aperture indicates that said auxiliary locking means has locked said automatic unlocking control.

8. A buckle according to claim 2 wherein said stop member is displaceable on said further shaft for adjusting the sensitivity of said auxiliary locking means.

9. A buckle according to claim 1 wherein said movable means of said auxiliary locking means includes a pendulum having a first extremity;

and wherein the brake means is a mercury micropump comprising:

a cylinder including a return channel;

a nozzle formed in said return channel;

a needle screw positioned in said nozzle for adjusting the opening thereof; and a piston slideable in said cylinder and connected to said first extremity of said pendulum for slowly forcing fluid in said cylinder through said nozzle and said return channel back into said cylinder behind said piston.

10. A buckle according to claim 1 wherein said bolt includes a release heel;

said buckle further comprising a manual control means for instantaneously releasing the shackle from said bolt, said manual control means comprising:

a slide movably mounted in said casing and having one end extending out of said casing to afford manual operation and the other end abutting against said release heel of said bolt for rotating said bolt around said shaft so as to disengage said bolt from the shackle for unlocking the shackle from said bolt, said drive spring instantaneously ejecting the unlocked shackle from said casing; and a slide return spring biased against said slide to return said slide to an initial position.

11. A buckle according to claim 1 wherein said frame means additionally includes a stirrup located outside said casing and mounted on said shaft, and wherein said frame means return spring is compressed between said casing and the cross-piece of said stirrup when the traction force is exerted by the shackle on said bolt.

12. A buckle according to claim 11 wherein said casing includes two lateral walls, each having an oblong aperture therein and wherein said shaft passes through said apertures and is displaceable in said aperture in the longitudinal direction of said buckle.

13. A buckle according to claim 1 wherein said automatic unlocking control includes a bolt recall spring which biases said bolt in a shackle locking position.

14. A buckle according to claim 1 wherein said casing includes a groove, and wherein said bolt includes an auxiliary locking heel which engages said groove under the action of the traction force exerted by the shackle on said bolt.

15. A buckle according to claim 1 wherein shackle includes a pivot for engaging a triangle plate when said buckle is to be used to lock the shackle of a parachute harness, said pivot permitting said triangle plate and said shackle to be disengaged so that a strap of said parachute harness connected to said triangle can be separated from a strap of said parachute harness connected to said shackle.

16. A buckle according to said claim 1 wherein the sensitivity of the automatic unlocking control is determined by the biasing force of the frame means return spring.

* * * * *